INVENTORS
DESMOND W. MOLINS
GORDON F. W. POWELL
FREDERICK POCOCK

By Watson, Cole, Grindle & Watson
ATTORNEYS

April 5, 1960  D. W. MOLINS ET AL  2,931,906
MEASURING DEVICES USING RADIO-ACTIVE MATERIALS
Filed Nov. 23, 1956  3 Sheets-Sheet 2

INVENTORS
DESMOND W. MOLINS
GORDON F. W. POWELL
FREDERICK POCOCK

By
Watson, Cole, Grindle & Watson
ATTORNEYS

United States Patent Office 2,931,906
Patented Apr. 5, 1960

2,931,906

MEASURING DEVICES USING RADIO-ACTIVE MATERIALS

Desmond Walter Molins, Gordon Francis Wellington Powell and Frederick Pocock, all of Deptford, London, England, assignors to Molins Machine Company Limited, London, England, a British company Application November 23, 1956, Serial No. 623,889

Claims priority, application Great Britain December 13, 1955

2 Claims. (Cl. 250—83.3)

This invention concerns improvements in measuring devices and more particularly radio-active scanning devices such as are used to measure the mass of a filler in a cigarette-making machine.

It is known to measure the mass of a cigarette rod by passing it between a source of penetrative radiation such as a beta-ray emitter and a ray-responsive device such as an ionization chamber which jointly constitute a measuring device referred to hereinafter as a scanning device. Such an arrangement is open to objection because if the rod should break, as sometimes happens, the ray path is practically unobstructed and where the measurement is used to control the speed of part of the machine, as is usually the case, the control is ruined for a considerable period because the apparatus is so affected by the surge of rays as to become "paralysed," the effect lasting up to fifteen seconds after the ray path is once more through a cigarette rod of substantially the desired mass. This means that after the machine has been restarted and a proper rod made, there will be a lapse of fifteen seconds before the scanning device is operating properly. In this time the control devices may, and probably will, have altered the speed to an undesirable rate and a lot of unwanted tobacco will be fed.

It is therefore desirable to perform the scanning operation while the tobacco is still in the form of an unwrapped filler (loose filler) which cannot break, and the invention provides means for this.

When a filler is being scanned an operator is liable to attempt to, for example, clear obstructions by poking a rod or like instrument between the emitter and the ray-responsive device and can easily injure the emitter by breaking its window which is very thin and frail. Such a breakage is dangerous and it is therefore desirable that the window should be easily and safely inspected. The invention therefore provides means for safely inspecting the window to avoid having to open the scanning unit to see the window.

Where a loose filler is to be scanned it is conducted between side guides forming with a suitable base, a trough, and it is necessary to ensure that the passing filler is scanned in its entirety, that dust is not allowed to accumulate on the windows of the lower unit (which is usually the ray-responsive device), and that the filler is presented in a form avoiding holes or sparse areas. That is, a filler may be fairly uniform as regards weight per unit length but so arranged in the trough that one side is dense while the other side is thin.

According to the invention there is provided a scanning device for a moving tobacco filler passing between side guides, comprising a ray emitter and a ray-responsive device (which are for example positioned one above and one below the filler, in either order), said filler being supported on a moving paper web and narrower than the web, whereby the web may be supported on a suitable support which is slotted, at least to filler width, and over a length at least equal to the length of the emitter. In this way the rays passing through the tobacco have only a thin layer of other material to pass through and this layer, the paper web, is part of the final product so that the result of the scanning operation depends only on the mass of the filler and the paper, that is, scanning is effected solely on the items whose weight is to be controlled. The alternative to such an arrangement is to support the filler on an endless travelling tape whose texture may be irregular and which may become irregularly engrained with dirt and fragments of metal or tobacco.

The invention further comprises a trough having side guides for a moving tobacco filler to be scanned by a ray emitter and a ray-responsive device which are positioned one above and one below the filler in either order, said guides diverging from the entry thereof whereby the filler is permitted to expand laterally somewhat as it moves along the guides.

Further the invention comprises a scanning device for a moving tobacco filler supported for movement between side guides and comprising a ray emitter and a ray-responsive device (which are for example positioned one above and one below the filler, in either order) wherein the emitter is disposed with its window lying obliquely across the filler whereby the filler is presented across its entire width to the rays. In this way an emitter source which may be narrower than the width of the filler can be used to pass rays through all the passing filler, any rays beyond the confines of the filler passing through masses (guides and other parts) which are of constant mass. It is very desirable that a ray source used for measurement of this kind should have as nearly as possible uniform emission per unit area and this means that there should be uniform deposition of source material. Such a result is best achieved by making the source as a narrow strip and therefore the oblique disposition of the emitter enables one to use the best possible source for measuring a relatively wide filler.

The invention further includes a scanning device as set forth in any of the three preceding paragraphs provided with devices (blowers or suckers) for cleaning the window of the lower element of the scanning device of dust tending to accumulate thereon.

A further feature of the invention is the provision of a periscope device whereby the window of the ray emitter arranged as set forth above may be inspected. The device could comprise prisms and windows of lead glass or other suitable medium to protect the viewer from the rays but an economical and very satisfactory device is obtained by forming a long prism with 45° reflecting surfaces at each end out of a transparent plastic material which is as good as glass for light transmission properties and also is of a nature which absorbs all the rays in a fairly short length of material. The plastic is preferably that sold under the registered trademark "Perspex" as this material has been tried and found satisfactory in all respects.

The filler guides and other suitable parts of the whole apparatus may be made of material (e.g. Teflon) to which dust does not readily adhere.

A brushing device movable across the emitter window may be provided and as the accuracy of the apparatus depends very much on operating under uniform conditions, a heater with temperature control may be provided to maintain a temperature such that the device is not affected by fluctuations in ambient temperature, or by heat due to friction or other causes nor by condensation of moisture for example from the paper or tobacco.

Apparatus according to the invention will now be described by way of example with reference to the accompanying drawings, in which.

Figure 1:
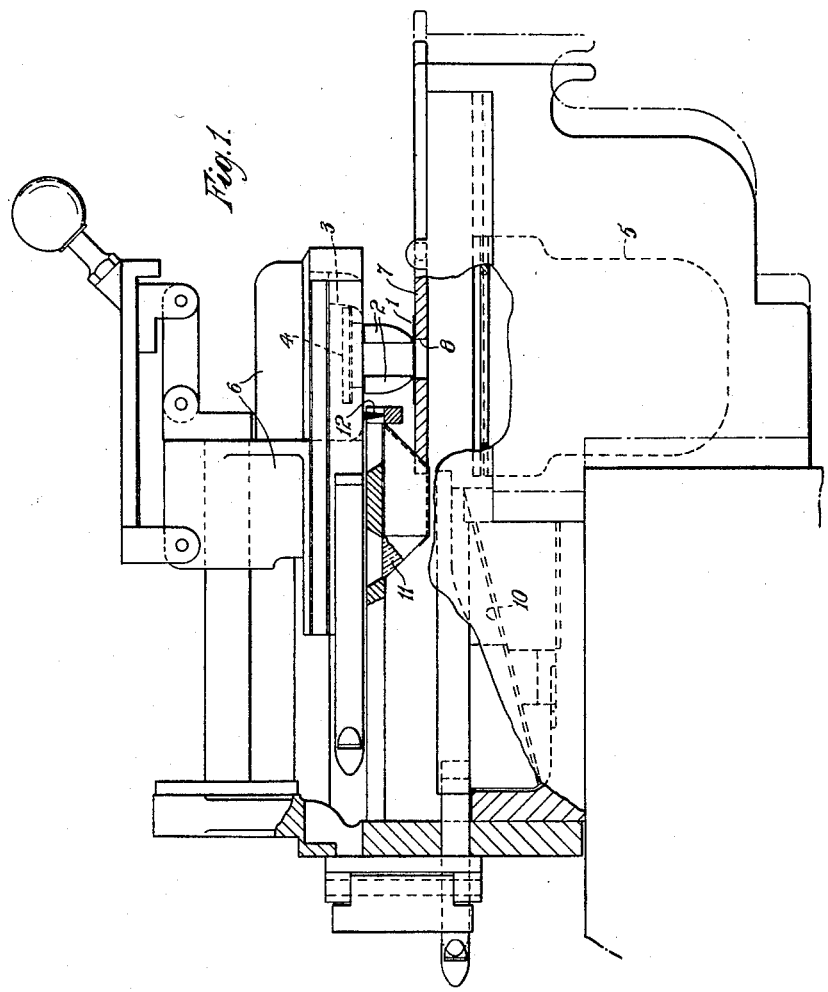
Figure 1 is a side elevation partly in section of apparatus comprising a scanning device for measuring the mass of a tobacco stream or filler, the parts being in operative position.

Referring to Figure 1, the apparatus shown is for use in a continuous rod cigarette-making machine, and is intended for measuring the mass of tobacco which is carried in a stream or filler on a paper web 1 between side guides 2. The apparatus comprises a box or housing 3 containing a ray source 4, and a casing 5 containing an ionization chamber. When the parts are in the position shown in Figure 1, rays from the source pass through the tobacco on the paper 1 to the ionization chamber, which with its associated parts effectively screens or shields the source and prevents any risk of the machine attendant being exposed to radiation.

Figure 2:
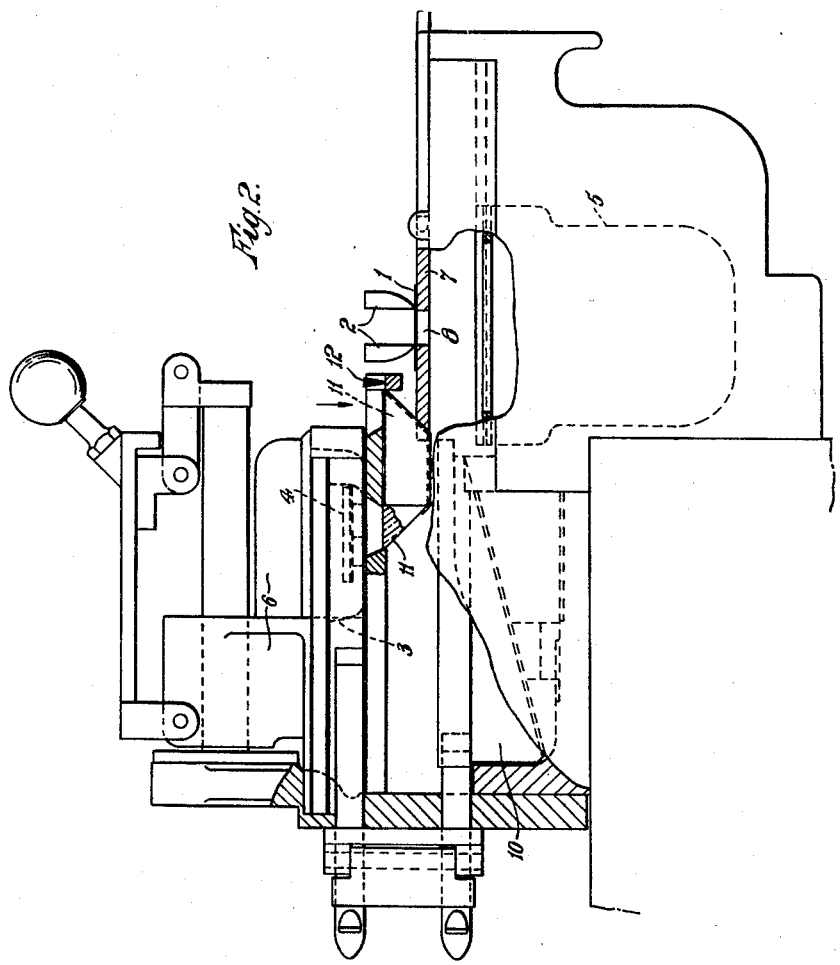
Figure 2 is a view similar to Figure 1, one of the elements of the scanning device being in the inoperative position.

The box 3 containing the source is mounted on a carrier 6 which is slidable horizontally to the inoperative position in which it is shown in Figure 2, in which position the source is also suitably screened. The reasons for this movement do not concern the present invention.

In order to allow the rays from the source 4 to reach the ionisation chamber and yet provide adequate support for the paper web the latter is supported by a table 7 which is slotted at 8. The width of the slot is a little more than the distance between the guides 2 and the slot is slightly longer than the box 3, see Figure 3. Thus the paper web is sufficiently well supported to enable it to carry the tobacco filler over the slotted table quite safely. Moreover the rays are only intercepted by tobacco and paper as will be more fully understood later when the source disposition is described.

Figure 3:
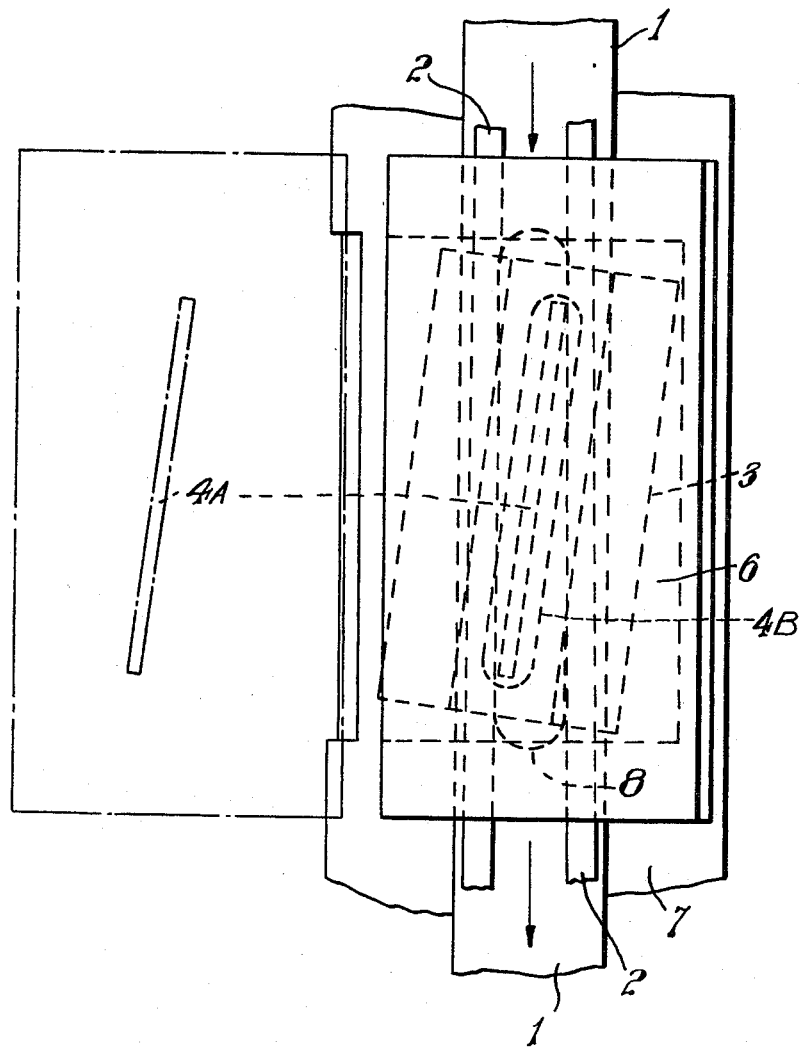
Figure 3 is a diagrammatic plan of parts of Figures 1 and 2.

The guides 2 are a little closer together at the upper part of Figure 3 than at the lower part so that the tobacco filler entering the narrow part in the direction of the arrow can expand slightly as it passes through the guides. By freeing the filler from lateral restraint in this way it can expand laterally and this freedom prevents any hold-up in filler movement through the scanning device and is generally beneficial.

From Figure 3 it will be seen that the ray source 4 is drawn with a narrow rectangular strip marked 4A at about its mid-width. This strip is the actual ray-emitting substance, or active part of the source, the rest of the ray source 4 being a body to contain said strip. A window 4B in the lower face of the ray source 4 permits the rays to pass out from the ray-emitting strip 4A. It will be noticed first that such a strip could not efficiently scan a filler of the width between the guides 2 and it is therefore arranged obliquely so that it extends exactly across the trough. In this way a narrow strip of active material which can be made to give substantially constant emission per unit area can be used to scan a much wider filler.

With the arrangement illustrated in Figures 1 and 2 it will be clear to those skilled in the cigarette machine art that dust will inevitably work down from the paper web and lie on the window of the ionization chamber, giving rise to false readings in the measuring device. To prevent this, a current of air is blown across the face of the chamber being supplied from a fan (not shown) and fed into a duct 10. Dust laden air passes away on the other side of the chamber to a collecting box (not shown).

It is important for health reasons that the window of the ray emitter should be inspected from time to time to see that it is intact and for this purpose a prism 11 is provided. If the ray source is shifted to the inoperative position of Figure 2, the source can be inspected by looking down at the prism in the direction of the arrow. The prism shown is made of a transparent plastic having adequate ray absorption qualities so that there is no risk of rays being emitted from the prism. A brush 12 fixed in the position shown in Figure 1 will sweep the window of the ray emitter, which is fitted to the box 3, and clear it of dust each time the carrier 6 is moved from the position shown in Figure 1 to that shown in Figure 2. A temperature controlled heating device (not shown) may be fitted to keep the volume embracing the emitter, guides, tobacco, and at least the upper part of the ionization chamber at a given temperature, high enough to be unaffected by temperature changes liable to be encountered with the machine running in a factory so that measurement takes place under conditions which are uniform as near as may be.

What we claim as our invention and desire to secure by Letters Patent is:

1. In a scanning device for a moving tobacco filler, the combination with a support plate for a moving paper web on which the filler is conveyed, and side guides for the filler positioned above said web and above the plate on which it is supported, said guides confining the filler to a width less than the width of said web, of a ray emitter and a ray-responsive device positioned one above the filler in proximity to the side guides and one below the support plate, said emitter comprising a housing, an elongated narrow strip of ray emitting substance within said housing, said strip being of substantially greater length and of substantially less width than the width of the filler between said guides, and a window in said housing through which rays from said emitting strip may pass, said support plate being slotted to permit the passage through the support plate and the filler of the emitted rays, and said emitter being positioned so that said emitting strip and window lie obliquely across said filler, whereby the entire width of the filler is scanned by rays emitted from a major portion of the length of said strip.

2. A scanning device as claimed in claim 1 the guides whereof diverge from the entry end thereof, whereby the filler is permitted to expand laterally somewhat as it moves along the guides.

References Cited in the file of this patent
UNITED STATES PATENTS
2,737,186   Molins _____ Mar. 6, 1956